C. DUCREUX.
Wagon Brake.

No. 77,467.

Patented May 5, 1868.

United States Patent Office.

CLAUDE DUCREUX, OF NEW YORK, N. Y.

Letters Patent No. 77,467, dated May 5, 1868.

---

IMPROVEMENT IN WAGON-BRAKES.

---

The Schedule referred to in these Letters Patent and making part of the same.

---

TO ALL WHOM IT MAY CONCERN:

Be it known that I, CLAUDE DUCREUX, of the city, county, and State of New York, have invented a new and improved Wagon-Brake; and I do hereby declare that the following is a full, clear, and exact description thereof, which will enable others skilled in the art to make and use the same, reference being had to the accompanying drawings, forming part of this specification, in which—

Figure 1:
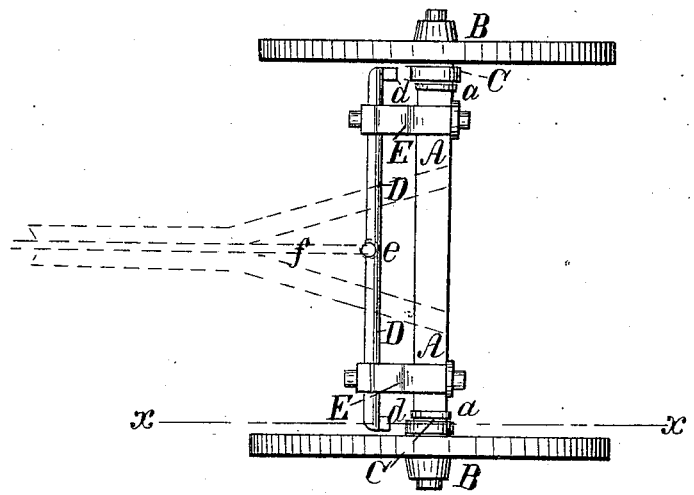

Figure 1 represents a plan or top view of my invention.

Figure 2:
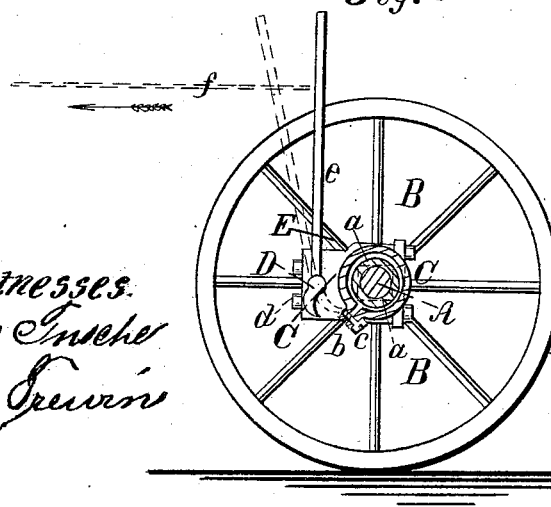

Figure 2 a vertical transverse section of the same, the plane of section being indicated by the line $x\,x$, fig. 1.

Similar letters of reference indicate corresponding parts.

This invention relates to a new wagon-brake, which can be attached to all wagons, but which is more particularly intended as an attachment to the self-acting safety-device for carriages, for which Letters Patent, No. 60,703, were granted me on the 1st day of January, 1867.

The invention consists in securing adjustable rings around the hubs of the rear wheels, said rings having lugs projecting from their peripheries, and in having an oscillating-bar hinged parallel to the rear axle, with projecting lugs at its ends, so that when the bar is turned by the forward motion of the brake-rod, pivoted to a crank on the bar, its lugs will strike against the lugs on the ring, and will thereby prevent the wheel from turning, thus stopping the carriage.

The rings can be adjusted more or less tight around the hubs, so that the wheels may either be brought to a dead stop, or may be allowed some motion when the brake is applied.

A represents the rear axle of a wagon, carriage, or other vehicle. B B are the wheels, hung on the axle A in the ordinary or suitable manner.

$a\,a$ are the hubs of the wheels B. Around the inner ends of the hubs are laid rings, C C, which either consist of one piece having lugs, $b\,b$, at the ends, and held together by means of a screw or bolt, $o$, as shown in fig. 2, so that the ends can be screwed together to make the rings fit more or less tight around the hubs, or which consist of two or more pieces, connected together by means of bolts, screws, or their equivalents fitting through flanges arranged at the ends of each piece.

D is a horizontal bar, having its bearings in blocks E E, which project from the axle A, or from another fixed part of the wagon.

The ends of the bar D are provided with projecting lugs $d\,d$, as shown, which are opposite to the inner ends of the hubs $a$.

$e$ is a crank projecting from the bar, and connected with the brake-rod $f$, as shown. As the brake-rod is in its neutral position, the lugs $d$ will be off the hubs, as in fig. 2, but when the rod is drawn forward the bar D will be turned, so that the lugs $d$ stand against the hubs $a$, as shown by red lines in fig. 1, and thus the lugs $b$ strike against the lugs $d$, as shown.

The carriage will thus be either totally stopped, or a certain degree of pressure will be brought to act upon the hubs $a$, to give a required motion. The pressure is more or less, according to the manner in which the rings were adjusted on the hubs.

The rings revolve with the hubs as long as the brake is not applied. One ring on one hub may be sufficient, although it is best to stop both wheels at once.

Having thus described my invention, what I claim as new, and desire to secure by Letters Patent, is—

The adjustable rings C C on the hubs of the wagon-wheels, when provided with lugs $b\,b$, in combination with the oscillating-bar D, having lugs $d$, all arranged and operating substantially as herein shown and described.

C. DUCREUX.

Witnesses:
  WM. F. MCNAMARA,
  ALEX. F. ROBERTS.